United States Patent [19]

Quigley

[11] Patent Number: 5,214,988
[45] Date of Patent: Jun. 1, 1993

[54] TUBE POSITIONING APPARATUS
[75] Inventor: John C. Quigley, Dracut, Mass.
[73] Assignee: Middlesex Paper Tube Co., Lowell, Mass.
[21] Appl. No.: 831,857
[22] Filed: Feb. 5, 1992
[51] Int. Cl.$^5$ .............................................. B23B 15/00
[52] U.S. Cl. ...................................... 82/48; 82/89; 82/102; 82/101; 413/35; 413/36; 413/37; 413/51; 493/288; 493/290; 493/297; 493/308
[58] Field of Search ............... 82/48, 83, 86, 89, 100, 82/101, 102; 413/35-37, 51; 493/287, 288, 289, 290, 297, 308

[56] References Cited

U.S. PATENT DOCUMENTS

| | | | |
|---|---|---|---|
| 460,317 | 9/1891 | Whitney | 82/102 X |
| 1,967,374 | 7/1934 | Scott | 82/89 |
| 2,020,113 | 11/1935 | Ferguson | 82/102 |
| 3,628,406 | 12/1971 | Stevens | 82/89 |
| 3,902,387 | 9/1975 | Reynolds | 82/101 |
| 3,911,797 | 10/1975 | Kastner . | |
| 3,933,090 | 1/1976 | Reynolds | 101/38 A |
| 4,108,034 | 8/1978 | Thomas | 83/361 |
| 4,130,036 | 12/1978 | Thomas | 82/90 |
| 4,185,348 | 1/1980 | Brock et al. | 15/101 |
| 4,258,613 | 3/1981 | Fegley et al. | 493/22 |
| 4,326,438 | 4/1982 | Ballerstein et al. | 82/53.1 |
| 4,370,140 | 1/1983 | Fegley et al. | 493/289 |
| 4,443,212 | 4/1984 | Mochizuki | 493/289 |
| 4,455,746 | 6/1984 | Idzik et al. | 30/106 |
| 4,508,531 | 4/1985 | Whitehead | 604/14 |
| 4,591,405 | 5/1986 | Languillat | 156/446 |
| 4,812,172 | 3/1989 | Brock et al. | 134/22.1 |
| 4,952,202 | 8/1990 | Itoh | 493/299 |
| 5,002,523 | 3/1991 | Cho | 493/273 |
| 5,016,507 | 5/1991 | Riera et al. | 83/384 |

OTHER PUBLICATIONS

Product Literature entitled "Retractable Mandrel Cutter," of Appleton Manufacturing, Menasha Corporation, P.O. Box 329, Menasha, Wisconsin 54952, consisting of 1 printed sheet and 2 photocopied photos, (undated).
Product Literature of John Eppler Machine Sales, Inc., 215 Marvin Road, Phila., Pa. 19117, 8 pages, (undated).
Product Literature entitled "Winders for Paper Tubes, Cans and Cores," of Paco Winders Inc., 2040 Bennett Road, Phila., Pa. 19116-3083, 6 pages, (undated).
Product Literature of Perkin, 102 Old Lane, Beeston, Leeds, England, LS11 8AG, consisting of 4 pages, (undated).
Product Literature entitled "PERKIN 3C," of C Perkin Ltd., 102 Old Lane, Beeston, Leeds LS11 8AG, England, single sheet, (undated).
Product Literature entitled "Parallel Labelling and Cut-Off Machine," of Guschky & Tonnesmann, D-4000 Düsseldorf-Reisholz, Henkelst. 243, Postfach 13 03 48, [West] Germany, 4 pages (undated).
Product Literature entitled "Automatic Tube Cutting Machine DEb" of Guschky & Tonnesmann, D-4000 Düsseldorf-Reisholz, Henkelstr. 243, P.O. Box 130 348, [West] Germany, consisting of one sheet, (undated).

Primary Examiner—Bruce M. Kisliuk
Assistant Examiner—John A. Marlott
Attorney, Agent, or Firm—Weingarten, Schurgin, Gagnebin & Hayes

[57] ABSTRACT

A tube positioning apparatus has at least one mandrel for positioning tubes for processing. A variable tube positioning stroke length is facilitated for optimizing stroke length and for optimizing the time required to position and process tube, such as by cutting. The tube positioning apparatus comprises a slide block having a mandrel attached thereto. The slide block is actuated on a plurality of slide rails from a first position to a second position. In the first position, the mandrel is retracted and in a second position the mandrel is extended for access by processing tools, such as circular knives for cutting the tube into desired lengths. A programmable sequence timer is provided for establishing desired time intervals during which the slide block and attached mandrel are in the retracted position or the extended position. In a tube recutter implementation, the programmable timer facilitates selectable time intervals for maintaining the slide block and mandrel in an extended state, engaging cutting means such as circular knives, disengaging the cutting means, and retracting the mandrel from the extended position.

23 Claims, 13 Drawing Sheets

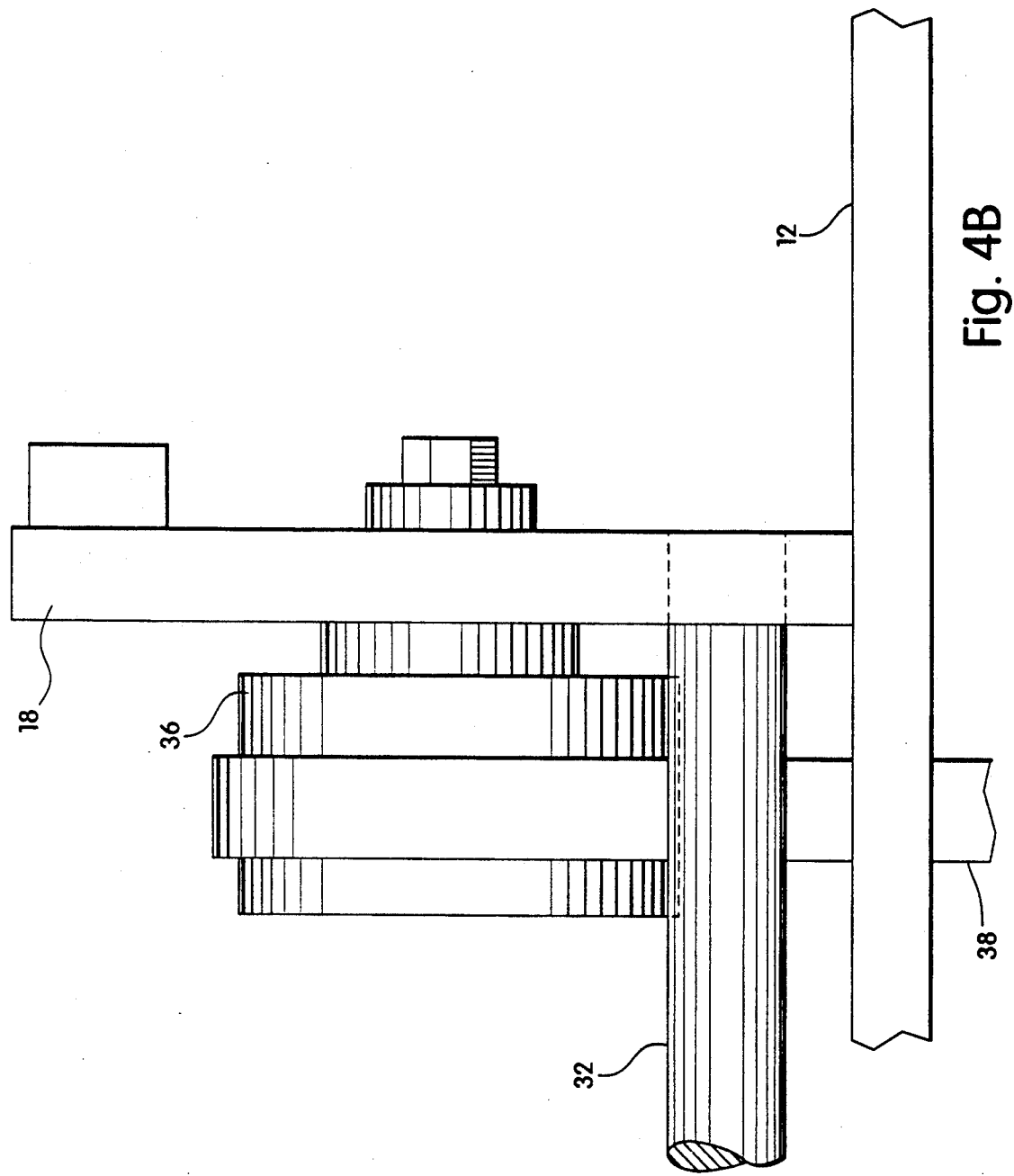

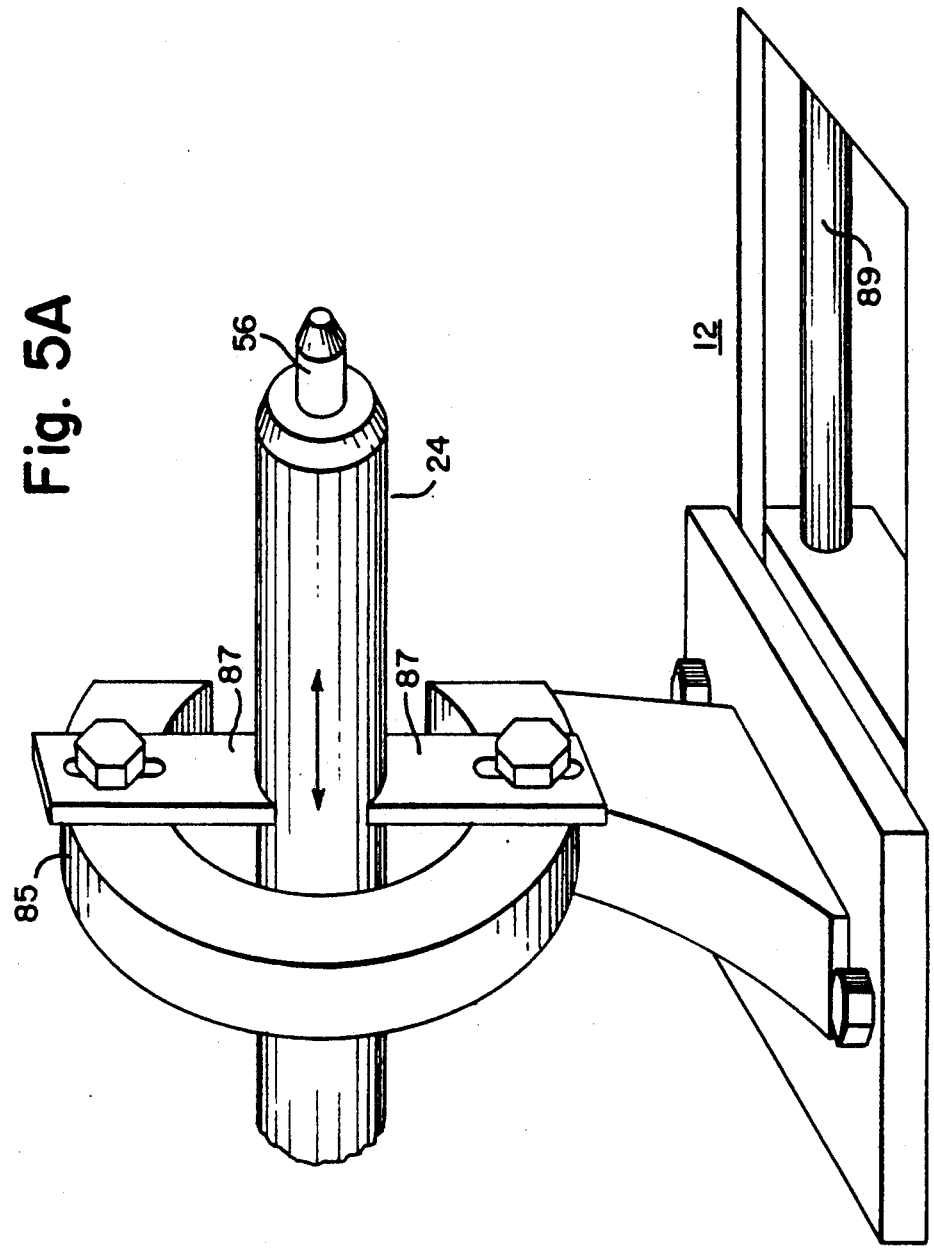

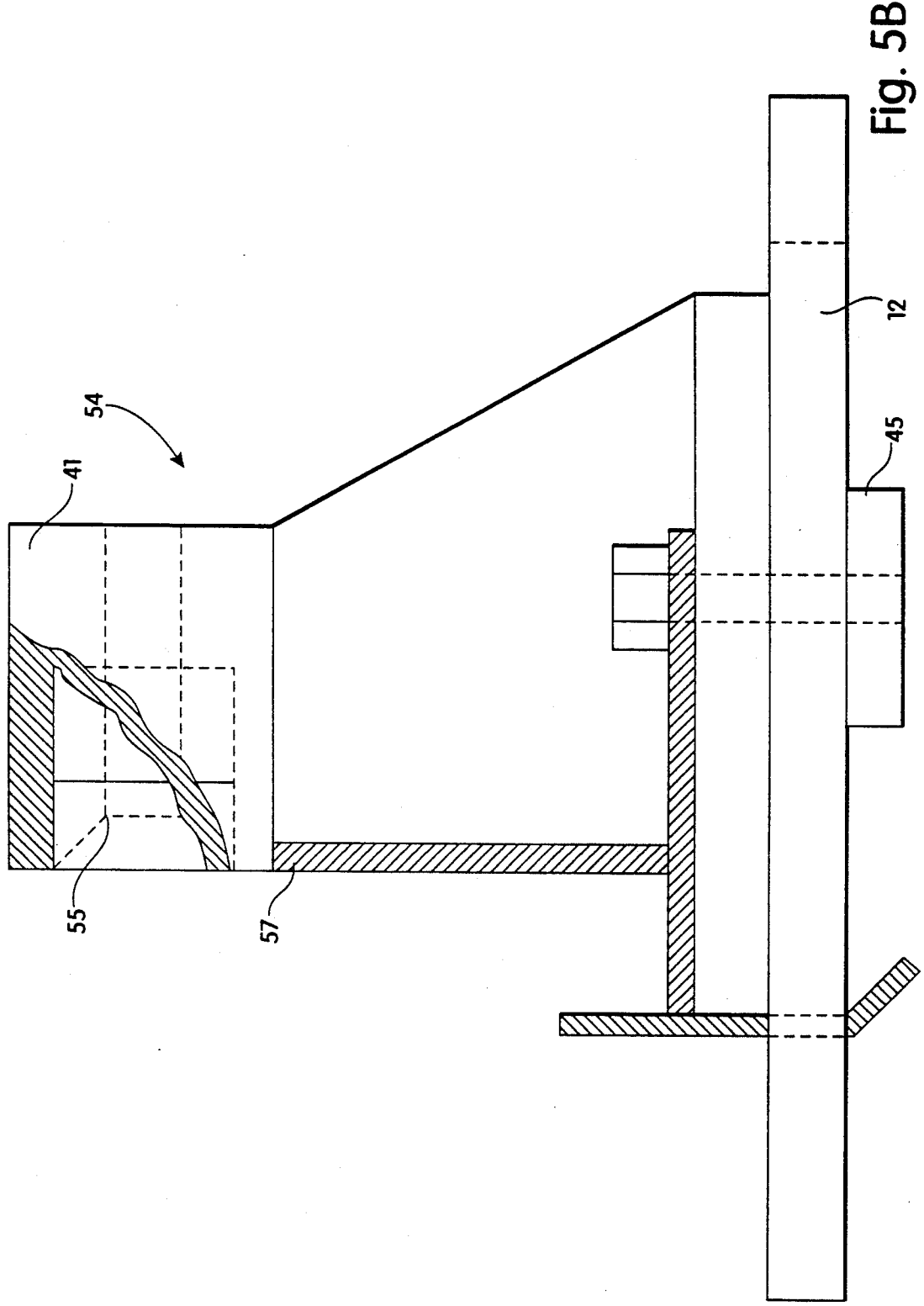

TUBE POSITIONING APPARATUS

FIELD OF THE INVENTION

The present invention relates to tube processing machinery, and in particular to an apparatus for positioning tube on a machine for cutting, seaming and/or otherwise processing tubes, such as paper tubes.

BACKGROUND OF THE INVENTION

Tubing is processed for numerous purposes, including packaging various consumer items like paper products and consumable foodstuffs. Typically, paper tube processing machinery is engaged for winding, cutting and labelling paper tubes used for packaging.

Machinery known for processing tubing, such as paper tubes, typically is engaged to perform a series of tasks on a tube concurrently. Some known machines, for example the Guschky Tonnesmann Parallel Labelling and Cut-Off Machine as illustrated in FIG. 1, incorporate a "turret" apparatus A, which completes numerous processes simultaneously. A paper tube B is loaded onto a first spindle C, labelling is performed on a second spindle D, a tube is trim cut on a third spindle E by means of a plurality of circular knives F, and the cut, labelled tubes G are discharged from a spindle at a fourth station. Thus, low cost paper tube packaging is substantially automatically generated via a single machine which performs numerous processes substantially simultaneously. However, such turret machinery typically operates at 10-30 cycles per minute, with the slowest operation being determinative of the overall operating speed. The spindles generally are rotating before any spindle end support is engaged, which creates difficulties with misalignment when rotating warped or unbalanced spindles contact a spindle end support. Spindle speeds must be limited to preclude warped and/or unbalance spindles from "whipping" and jamming the machine Further, turret type machines are typically machinery intensive and disadvantageously require a stock of spindles be retained for potentially replacing three or four spindles at a time. Thus, single spindle, single process machinery has been developed to reduce machinery requirements and perform a single operation on a tube, so as to permit batch processing of tubes without limiting processing speeds by an operation which must be performed at slower speeds than other operations.

An exemplary single mandrel, or spindle, tube cutter is illustrated in U.S. Pat. No. 3,902,387 to Reynolds. The Reynolds tube cutting apparatus comprises a stationary, rotatably mounted single mandrel and a movable mandrel loading platform which is reciprocated by a driving cylinder mounted to a supporting frame. The movable platform reciprocates back and forth on a plurality of rods mounted to the support frame and has a bar attached thereto with a rotatable cup at an end thereof to facilitate loading of tube on the stationary mandrel. The platform/bar/cup assembly is actuated by the cylinder in a first direction into a tube receiving portion of a tube support tray. A tube loaded into the tube support tray is engaged by the bar/cup and actuated with the platform in the first direction, displacing the tube from the tube support tray and pushing the tube onto the stationary, rotatable single mandrel for cutting. The tube is cut and the platform actuated in a second direction to retract the bar/cup and a mandrel support, which pushes the cut tubes from the stationary mandrel onto a discharge chute. When the platform is fully retracted the platform/bar/cup assembly is ready to load the next tube onto the stationary mandrel for cutting.

Disadvantageously, the Reynolds tube cutting apparatus requires significant displacement of the tube being processed, which introduces opportunities for mis-feeding and jamming malfunctions of the machine resulting in waste and downtime. Like turret-type machines the single spindle of the Reynolds-type machine is also rotating prior to engagement of any spindle end support, limiting spindle rotation speeds and presenting the opportunity for mis-feeding and jamming caused by warped or unbalanced spindles. Further, the platform/bar/cup loader which actuates tubes onto the stationary rotatable mandrel, must have sufficient space between the end of the stationary mandrel and the end of the tube support tray so that the cut tubes being stripped from the mandrel as the loader retracts can fall unimpeded into the discharge chute. Such sufficient space dds to the overall stroke length the loader must travel to displace and load a tube on the stationary mandrel. Such additional travel is translated into undesirable additional time required to process tubes on the apparatus.

Additionally, the Reynolds tube cutting apparatus requires that the platform/bar/cup loader which actuates tubes onto the stationary rotatable mandrel must always be actuated a full stroke, including the additional travel discussed hereinbefore, to displace and load tubes onto the mandrel. The full stroke of the loader, through the tube support tray to the rotating mandrel until the cup supports the rotating mandrel, is required regardless of the length of the tube that is being cut. Similarly, the loader must be fully retracted a full stroke in order to discharge the cut tube and load and cut a subsequent tube. Such full stroke travel may be unnecessary and undesirable in applications where short tube lengths are to be processed. Full stroke travel also limits the flexibility of the apparatus precluding progressive cuts of varying lengths involving limited travel of the tube being processed.

As discussed, both the turret-type and single spindle Reynolds-type machines are significantly limited in terms of spindle rotational speed due to commencement of spindle rotation prior to spindle end support. Both machine types are undesirably susceptible to mis-alignment and jamming problems at higher speeds due to undesirably large tube or workpiece displacement. Waste separation or control has been a problem with both machine types because of the significant lateral displacement of the tube, i.e. waste cut tube ends must be hand picked from or packaged with the cut tube product. Either a costly optional device must be purchased or waste control is not dealt with at all. In addition, both types of machines known in the prior art require the processing means or knives to be retracted and actuated considerably, either because of fixed mechanical camming of the knives or to provide clearance for the tube being displaced onto and off of the rotating spindle. Such exaggerated travel of the processing means or knives translates into undesirably increased processing time.

SUMMARY OF THE INVENTION

The present invention provides a tube positioning apparatus having at least one mandrel for positioning tubes for processing with minimal tube displacement, wherein a variable tube positioning stroke length is facilitated for optimizing stroke length and for optimizing the time required to position and process tube, such as by cutting.

According to the invention, a tube processing apparatus comprises a slide block having a mandrel attached thereto. The slide block is actuated on a plurality of slide rails from a first position to at least a second position. In the first position, the mandrel is retracted and not rotating and in a second position the mandrel is rotating with its end supported, and extended for access by processing tools, e.g. circular knives for cutting the tube into desired lengths.

In further accord with the invention, a programmable sequence timer is provided for establishing desired time intervals during which the slide block and attached mandrel are in a retracted position or an extended position. In a tube recutter implementation, the programmable timer facilitates selectable time intervals for: maintaining the slide block and spindle in an extended state; engaging cutting means such as circular knives or saws; disengaging the cutting means; and retracting the mandrel from the extended position.

Features of the invention include fully automatic loading, positioning, processing and off-loading of tubes on a programmably reciprocating spindle which requires minimal tube displacement and provides minimal opportunity for mis-feeds and waste. Minimal tube displacement permits minimal processing means actuation, e.g. less travel of the knives, which facilitates faster processing time(s). A plurality of position sensors or limit switches facilitate a plurality of extended and retracted positions of the actuatable mandrel whereat various operations are performed. Limit switches wired to the sequence timer enable successive operations only when the mandrel is properly positioned. Waste guides permit segregation of waste as it drops. Programmably timed position dwell permits optimizing operation timing, e.g. the mandrel can be maintained longer in an extended position to cut thicker tube or shorter for thinner tube. A single operation's timing, for example cutting time, can be changed while maintaining the timing of other operations, such as the time the mandrel is extended or retracted. Optimal times for operations in a particular process can be stored and recalled to significantly reduce set-up time. The sequence timer can be set for single cycle or for continuous operation.

DESCRIPTION OF THE DRAWING

Other features and benefits of the present invention will be more clearly understood with reference to the specification and the accompanying drawings of which:

FIG. 4B is a side view of a mandrel drive support plate of the base, and attachments thereto;

FIG. 5A is a perspective view of a recut tube stripper for removing cut tube from a mandrel as the mandrel is retracted;

FIG. 5B is a side view partially broken away of a mandrel end support bearing;

DETAILED DESCRIPTION

Figure 1:
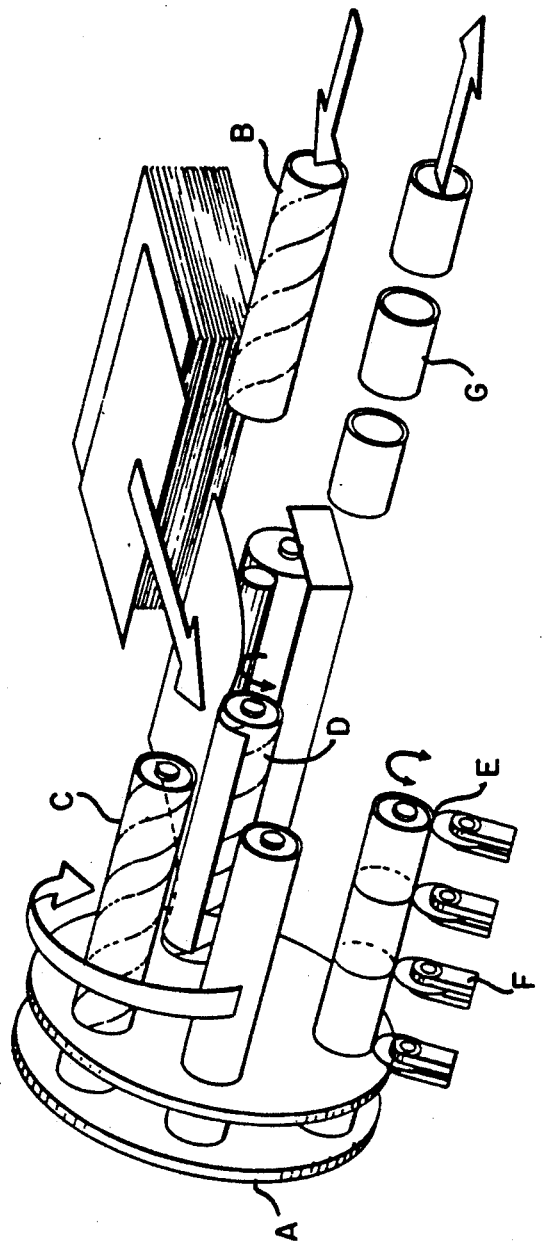
FIG. 1 is a schematic view of a turret-type tube processing apparatus according to the prior art.
Figure 2:
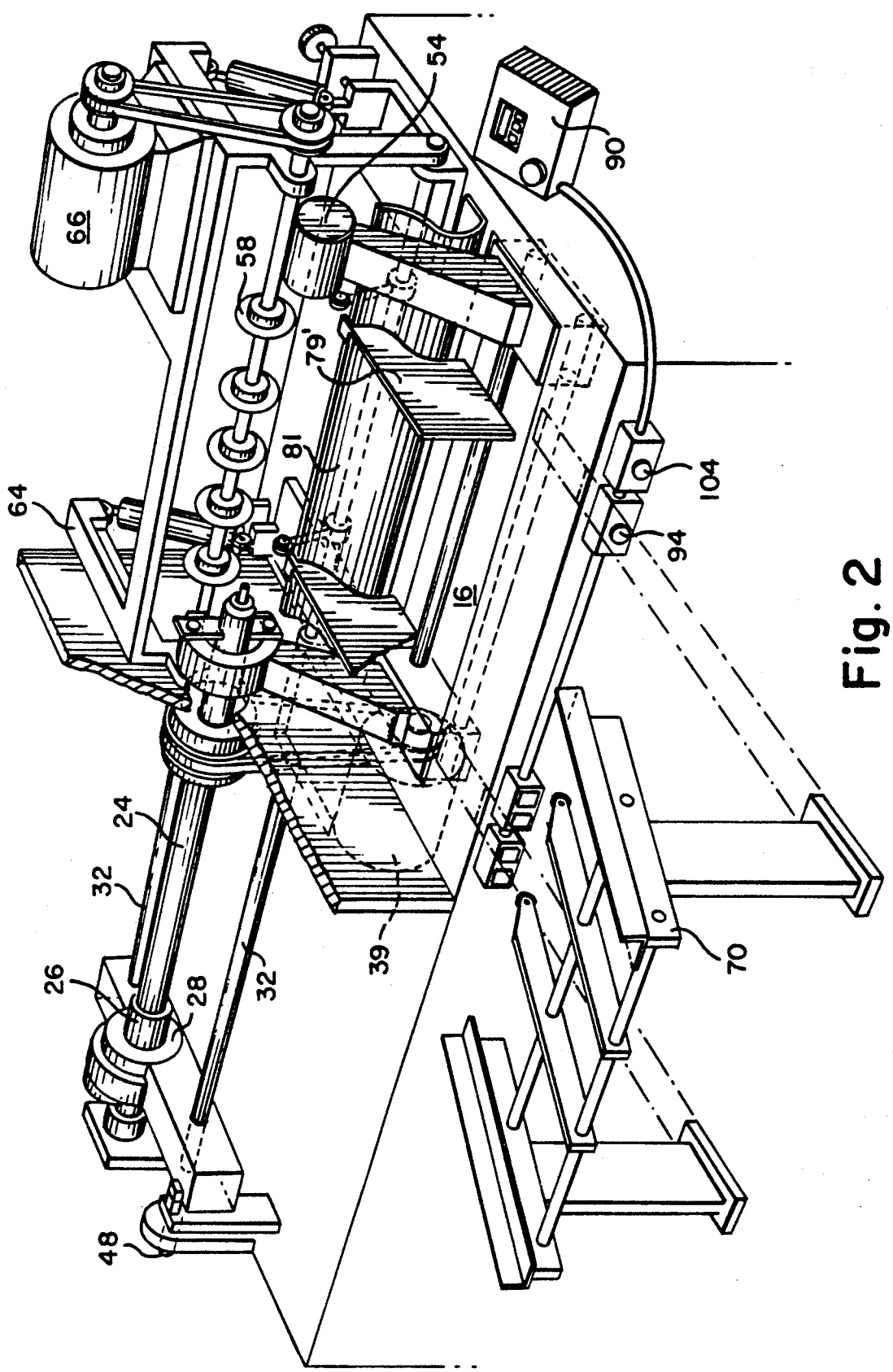
FIG. 2 is a perspective view of a tube cutting implementation of a tube positioning apparatus according to the invention.

An illustrative embodiment of a tube positioning apparatus according to the invention is implemented in a single spindle tube cutting or recutter machine as illustrated in FIGS. 2-7. The machine 10, shown in perspective in FIG. 2, is built on a base 12 which provides a platform on which to configure the various components of the apparatus. The base 12 has a plurality of cut-outs. A first cut-out 14 provides a passage for a belt, or other drive means such as a chain, to pass from a motor located beneath the base to a mandrel drive pulley to be discussed hereinafter. A second cut-out 16 provides a passage for tubes to pass from the apparatus, subsequent to processing, to a receptacle or conveyor means (not shown) beneath the base 12. The base 12 also has a mandrel drive support plate 18 disposed substantially centrally and perpendicularly with respect to the base 12.

The mandrel drive support plate 18 effectively divides the tube recutter embodying the tube positioner according to the invention into a mandrel actuating side 20 and a tube processing or cutting side 22, while providing a means of attaching various components of the positioning apparatus.

The mandrel actuating portion 20 of the apparatus comprises a mandrel 24 which is a rotatable spindle of a desired length and circumference suitable for snugly, slidably engaging the interior of a tube to be processed. The mandrel 24 is mounted at one end in a mandrel holder 26 via mechanical fastening means, such as allen screws, pins or other suitable hardware, and is aligned for substantially concentric rotation. An opposite end of the mandrel preferably has a hardened end protrusion for engaging a mandrel end support bearing discussed hereinafter. The mandrel holder 26 has a clutch plate 28 fixed thereto. The mandrel 24, mandrel holder 26 and clutch plate 28 are attached to a slide block 30 via tapered roller bearings, such as Timken Type Tapered Roller Bearings, so that they are rotatable with respect thereto.

The slide block 30 is mechanically engaged with a plurality of guide rails or bars 32, which are fastened to the base 12 at a first end and to the mandrel drive support plate 18 at a second end. Preferably, the guide rails 32 are hardened steel and the slide block 30 is engaged therewith using linear motion ball or roller bearings, such as Thompson Super Ball Bushing Bearings. Two guide rails 32 are provided to balance stresses on the guide rails 32 as the slide block 30 is linearly actuated on the rails 32. At least one drive cylinder 34 (shown on the tube cutting side 22 in FIG. 5) is included having a piston rod attached to the slide block for effecting the linear actuation thereof. In the illustrative embodiment, the drive cylinder 34 is a pneumatic cylinder controlled by solenoid operated air valves in conjunction with flow controllers known in the art and a programmable sequence timer discussed hereinafter. The drive cylinder 34 is located 12 centrally on the tube cutting side 22 of the base 12 so that when the piston rod of cylinder 34 is fully extended the slide block 30 and mandrel 24 are in a fully retracted state. Thus, when the piston rod of the cylinder 34 is fully retracted the slide block 30 and mandrel 24 is in the fully extended state.

The guide rails 32, on which the slide block 30 is actuated, terminate at the mandrel drive support plate 18, which also serves as a mounting member for a mandrel drive pulley 36 which is driven by a drive means 38, i.e. chain or belt, passing through the cut-out 14 from the drive motor 39 (shown in FIG. 2) beneath the base 12. The mandrel drive pulley 38 is a hollow pulley having a central void 40 which is at least large enough to permit the circumference of the largest mandrel 24 to pass therethrough. A confronting face 42 of the mandrel drive pulley 38 is machined to frictionally engage the configuration of the face of the clutch plate 28 when the slide block 30 and mandrel 24 are in the fully extended position.

The mandrel actuating portion 20 further includes a plurality of shock absorbers or dampeners. A first pair of dampeners 44 is mounted on or within the slide block 30 and acts to cushion the impact of the slide block 30 against stops 46 as the mandrel is fully actuated through the mandrel drive pulley void 40. A second pair of dampeners 48 cushion the impact of the slide block 30 as it is fully retracted. A plurality of limit switches 50 indicate the position of the slide block 30 and in conjunction with a programmable sequence timer effect control of various operations of the recutter implementation in accordance with slide block/mandrel position, as discussed hereinafter.

Figure 3:
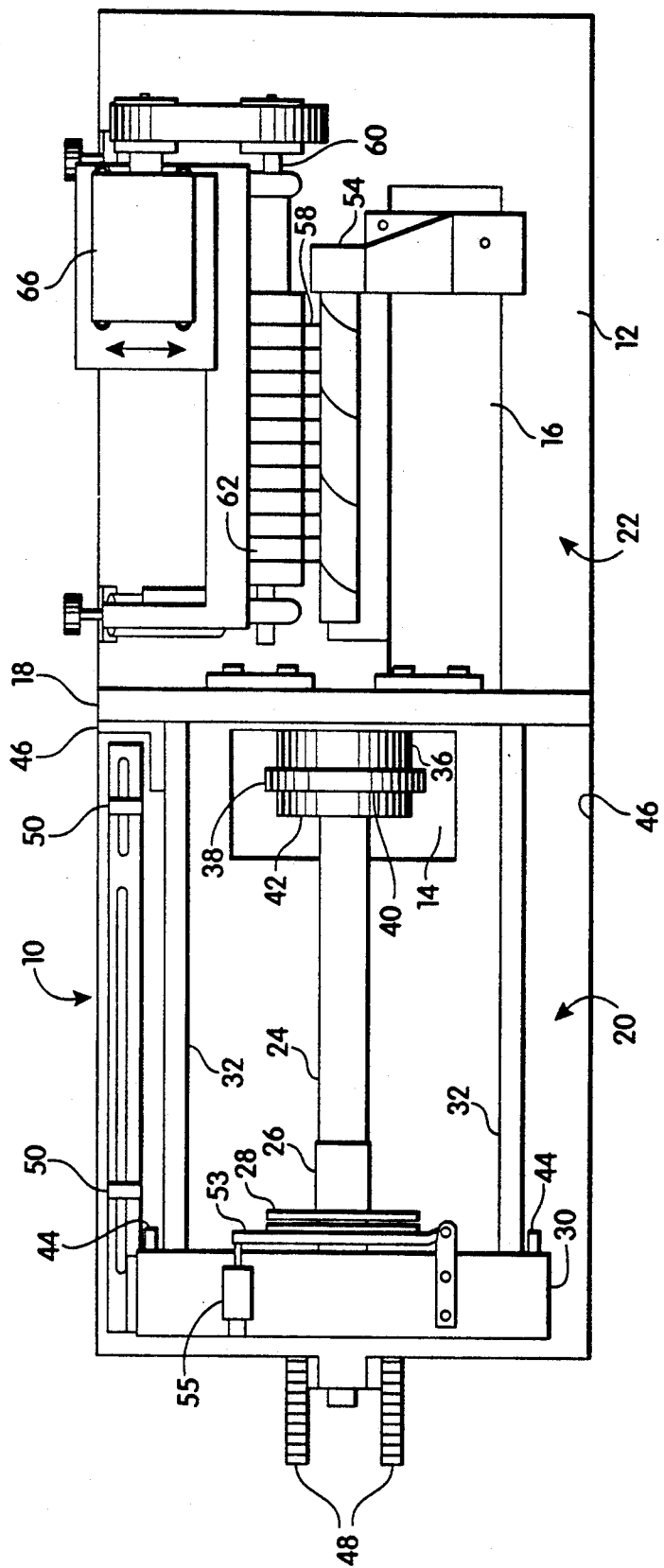
FIG. 3 is a top view of the tube cutting implementation of the tube positioning apparatus of FIG. 2 having the a slide block and mandrel in a retracted position.
Figure 4:
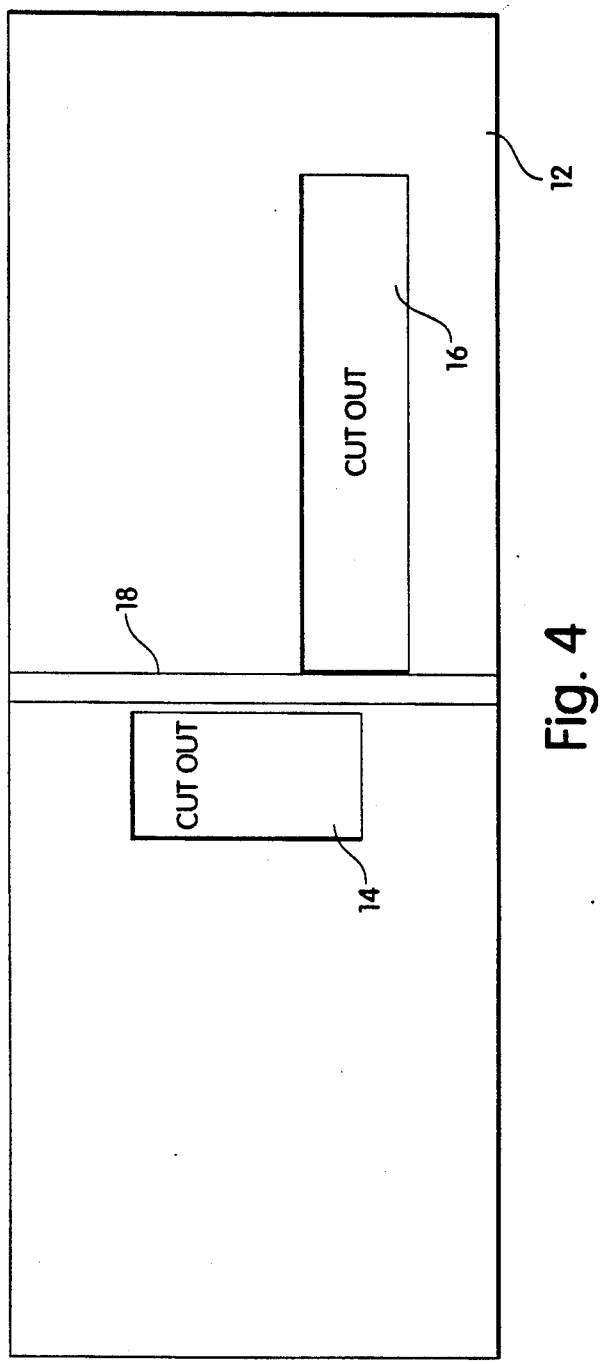
FIG. 4 is a plan view of a base of the tube cutting implementation of the tube positioning apparatus of FIG. 2.
Figure 4A:
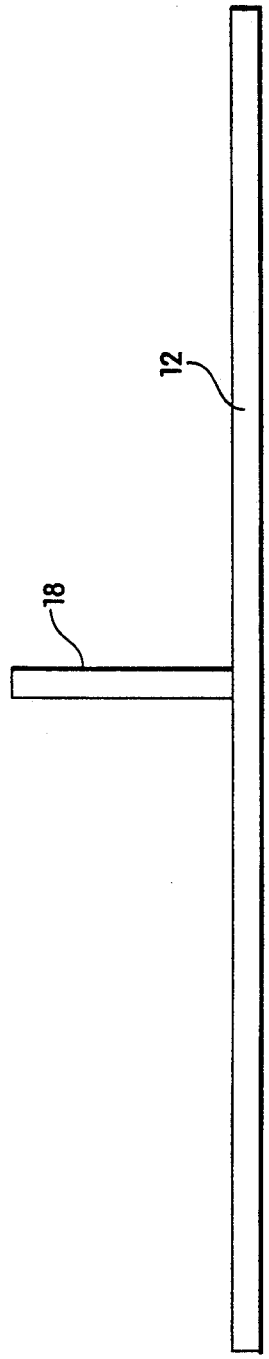
FIG. 4A is a side view of the base of the tube cutting implementation of the tube positioning apparatus of FIG. 4.
Figure 7:
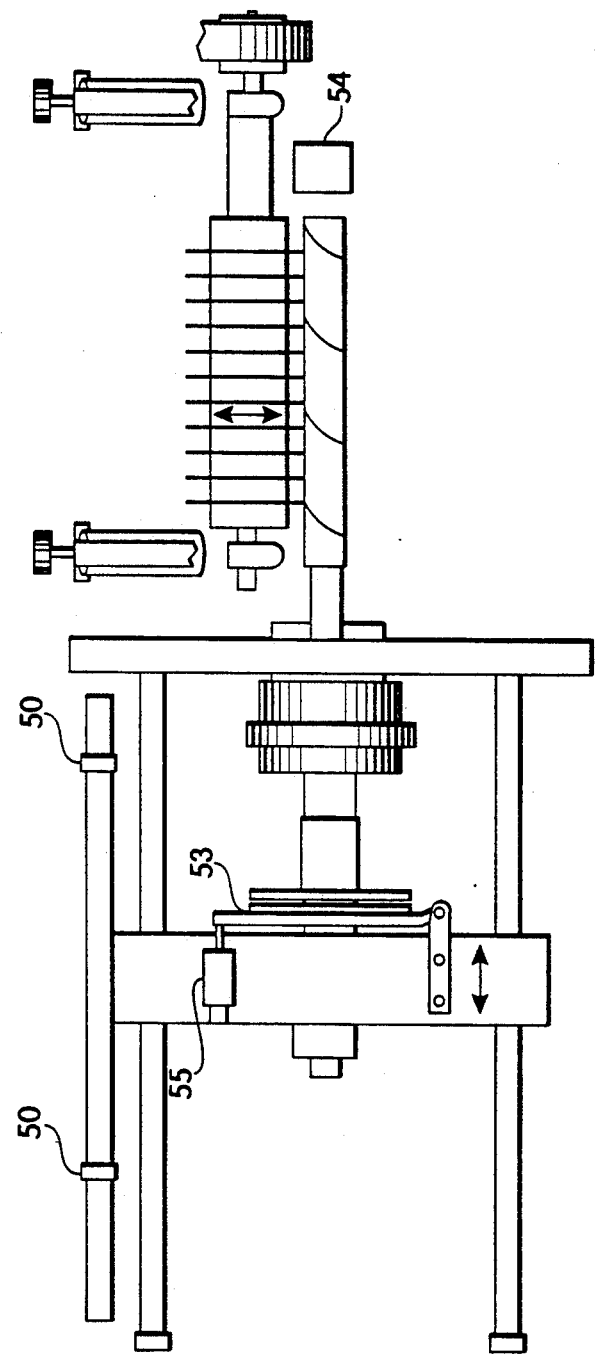
FIG. 7 is a top view of the tube cutting implementation of the tube positioning apparatus of FIG. 2 having the slide block and mandrel in an extended position.

Optionally, the mandrel actuating portion 20 also includes a mandrel brake 52 attached to the slide block 30. As shown in FIGS. 3 and 7, the brake is a disk 53 attached behind the clutch plate 28 for stopping the rotation of the mandrel 24 by friction engagement of a solenoid or cylinder 55 activated by a limit switch 50 when the slide block/mandrel is retracted.

A mandrel end support bearing 54, as illustrated in FIGS. 2, 3 and in greater detail in FIG. 5B, is located on the processing or cutting side 22 of the recutter implementation of the positioning apparatus illustrated. The mandrel end support bearing 54 operates integrally with the mandrel actuating portion of the positioning mechanism, to receive the extended mandrel and assure its controlled rotation and support. The end support bearing 54 is adjustable and optimally mechanically set-up and adjusted to be rigidly fixed to the base 12 and to receive the extending mandrel end prior to rotation of the mandrel caused by the engagement of the clutch face and the confronting face 42 of the mandrel drive pulley 38. The mandrel end support bearing is comprised of a bearing housing 43 and mount 45 that can be adjusted laterally along the path of the extending mandrel to accommodate variable stroke lengths of the positioner mandrel. Once properly adjusted, the support bearing 54 is fixed until readjusted for another setup. A suitable bearing, such as a standard double row ball bearing with inner and outer race, is disposed within the support bearing 54 housing behind a guide insert 55 which receives the hardened end protrusion 56 of the extending mandrel 24 and guides it toward the inner bearing race. The inner diameter of the inner bearing race is slightly larger than the outer diameter of the end protrusion 56 of the mandrel 24 so that relatively tight tolerances can be held with regard to the relationship between the mandrel 24 and the tube cutting means. The construction of the mandrel end support bearing 54, which receives the mandrel end before the mandrel commences rotation, permits faster mandrel rotating speeds because it is relatively unaffected by out of balance or slightly warped mandrels. The mandrel end support bearing 54 has a member 57 or surface which abuts a positioned tube to prevent lateral movement of the tube o the rotating mandrel.

The tube processing or cutting side 22 of the recutter implementation including the tube positioning mechanism according to the invention, comprises a plurality of cutting means such as circular knives 58 or saws, best illustrated in FIGS. 2, 3 and 5-7. The cutting means are mounted on an arbor 60 and separated by spacers 62 to the desired spacing in accordance with the desired dimensions of the tube cut. The arbor 60 is mounted on a tool frame 64 which in this implementation also includes a mount for a motor 66 or other means to drive the circular knives 58. The entire tool frame 64 is pivotably mounted on a pivot bar 67 and actuatable via at least one cylinder 68 (FIG. 6), so that the driven knives can be brought into contact with a tube positioned as described hereinafter.

Figure 6:
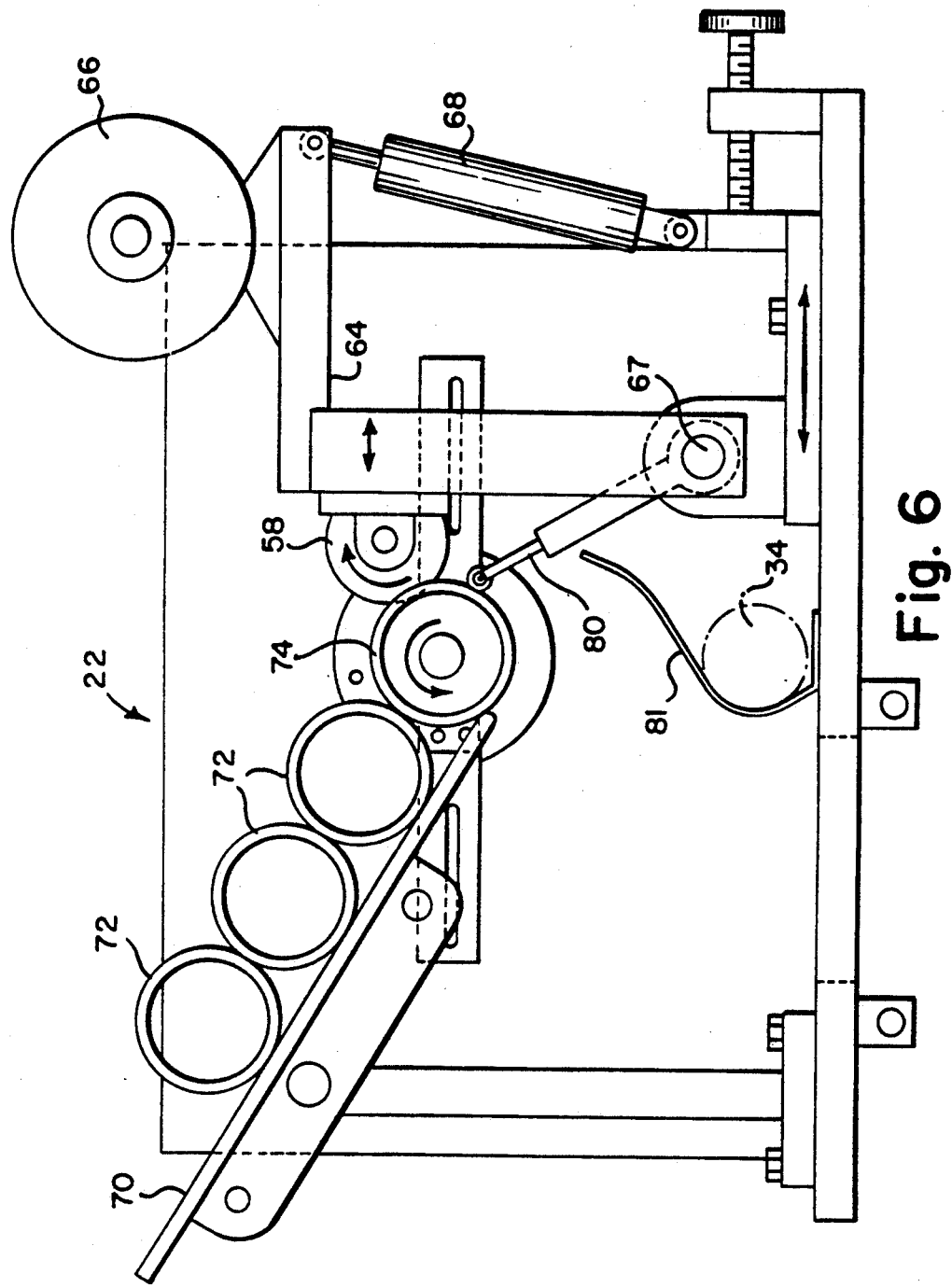
FIG. 6 is an end on view of the tube cutting implementation of the tube positioning apparatus of FIG. 2 having a tube resting on locating devices.

A feed ramp 70, illustrated in FIG. 6, holds a plurality of tubes 72 which have been manually or automatedly disposed thereon. A leading tube 78 descends the ramp 70 whereupon it is received by a plurality of locating devices. A first set of locating devices 80 are disposed at the end of the feed ramp 70. An opposing set of locating devices 82 are attached via shafts to the pivot bar 67 of the tool frame 64. The opposed sets o locating devices 80, 82 initially position the unprocessed tube for engagement by the mandrel 24 as it is actuated to the extended position and are alternately spaced in this embodiment to permit the processed, i.e. cut, tube to drop through the cut-out 16 for packaging or conveying subsequent to processing. The locating devices 80, 82 preferably are adjustable and actuatable to facilitate contact with the circumference of tubes of various sizes. Small single row ball bearings are disposed at an end of the locating devices which contact the tube. The bearings are positioned to rotate in the same direction as the tube being cut and to provide minimal impedance to processed tubes being stripped from the mandrel.

Figure 5:
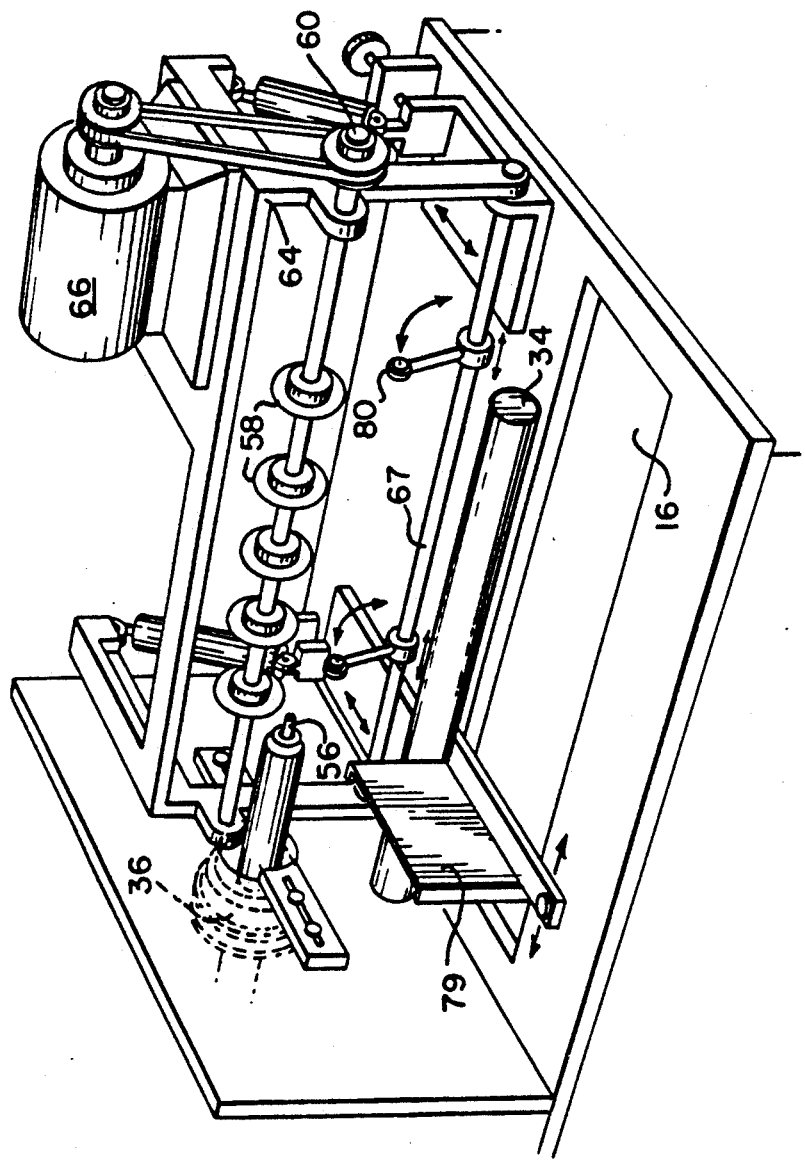
FIG. 5 is a perspective view of a cutter side of the tube cutting implementation of the tube positioning apparatus of FIG. 2 having the slide block and mandrel in an extended position.

Processed tubes are stripped from the mandrel by a stripping mechanism as the mandrel is retracted from the extended position. The stripping mechanism 84, shown in FIGS. 5 and 6, is mounted directly to the mandrel drive support plate 18. It permits the mandrel to pass through unaffected in the extend mode. During retraction of the mandrel 24, the stripper 84 engages the processed tubes as the mandrel backs through the mandrel drive support plate 18 and the cut tubes are stripped and drop, directed by a tube bumper 81, through the cut-out 16 for packaging or conveying. Waste ramps 79, 79' (shown in FIGS. 5 and 2 respectively), are adjustably mounted in the cut-out 16 or on the tube bumper 81 to direct waste ends of the cut tube to a receptacle s that the waste ends are not packaged with the desirable recut tubes.

Alternatively, a moveable stripping mechanism 84' can be implemented as illustrated in FIGS. 2 and 5A. A c-shaped portion 85 substantially surrounds the mandrel 24 providing sufficient clearance for various circumference mandrels to pass therethrough. Appendages 87 extend inward toward the center of the c-shaped portion 85 and can be adjusted to align with and provide the necessary contact with the cut tube so as to strip the tube as the mandrel is retracted. The movable stripper is adjustable along a path coaxial with the path of the extended mandrel and can be fixed to the walls of the cut-out 16 at the desired location or fastened to mounting bars 89 at the extremes of the cut-out 16. The moveable stripper permits the stroke length of the mandrel to be optimized for removing processed tube from the retracting mandrel 24. The moveable stripper can be interfaced with the sequence timer to be actuated in accordance therewith to provide a programmably moveable stripping mechanism.

Figure 8:
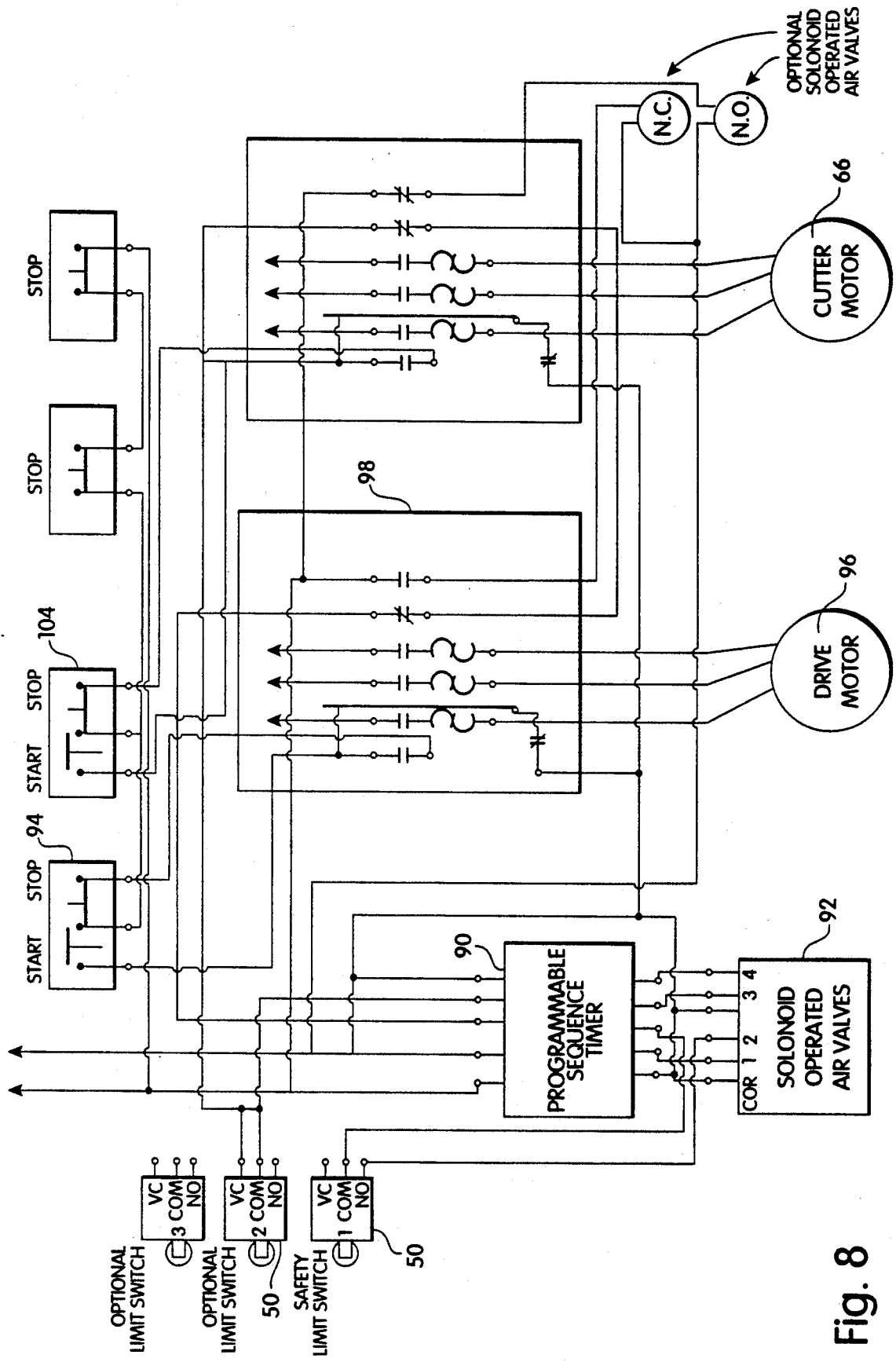
FIG. 8 is a schematic diagram of a programmable sequence timer and switching implementation for the tube cutting implementation of the tube positioning apparatus of FIG. 2.

Referring now to FIGS. 2 and 8, a programmable sequence timer 90 controls the overall functionality of the positioning mechanism and the tube processing function by coordinating the timing and sequence of operation(s). The present illustrative recutter embodiment of the positioning mechanism according to the invention requires only a relatively simple programmable control device, such as a TELE Control Ltd. 4091 PZ1 twenty-step timer with eight programmable outputs. It is desirable that the programmable sequence timer have a reset input that allows the timer to be selectively reset to the beginning of a program. Other desirable features of the sequence timer include a stop input to allow a program to be selectably stopped and restarted at any point during program execution, and a trigger input to permit advancing to succeeding program steps without completing the step in progress The sequence timer must have the flexibility to enable changing of the timing of program steps without affecting other steps and should be programmable in time intervals of 0.01 second in a sufficient timing range, such as from 0.01 second to 99 hours and 59 minutes per step.

A plurality of timer output relays (shown integral to the timer 90 in FIG. 8), affect a plurality of solenoid operated air valves 92 which in turn activate the cylinders and devices for actuating the functional elements discussed hereinbefore. In the illustrative embodiment four output relays are used and designated: 1) mandrel extend; 2) cutters in; 3) cutters out; and 4) mandrel retract. Each output used is assigned a time value between 0.01 second and 99 hours 59 minutes, programmable in increments of 0.01 second. The time value of each of the respective outputs will depend on the application and can be changed without affecting another output. For instance for thicker tube to be cut it would be desirable to program a relatively greater time for "cutters in" (output 2) than for thinner tube.

When a main start/stop switch 94 is activated, a mandrel drive motor 96, preferably located under the base 12 and used to drive the mandrel drive pulley via a belt or chain through the cut-out 16, is activated by a magnetic drive motor starter 98. Similarly, a cutter motor 66, used in the case where the cutter means is driven, is started via a cutter motor magnetic starter 102 by activating a cutter motor starter switch 104. When both the drive motor starter switch 94 and cutter motor starter switch 104 are activated, the sequence timer output 1 (mandrel extend) activates its respective three position solenoid operated air valve 92 which affects the mandrel drive cylinder 34 and causes the slide block 30 to extend the mandrel to and through the mandrel drive pulley void 40 (engaging a tube to be processed thereafter), until the mandrel end protrusion 56 engages the mandrel end bearing housing 54, and the clutch face engages the confronting face 42 of the drive pulley to effect rotation of the mandrel 24.

The tube to be processed, i.e. recut, is gravity fed down the feed ramp 70 to the locating devices 80 which position the center axis of the tube just slightly below the center axis of the mandrel, in the path of the extending mandrel. While the sequence timer output 1 (mandrel extend) is asserted, the mandrel end protrusion 56 extending through the tube, is received by the mandrel end support bearing 54 which assures controlled rotation of the mandrel 24 upon engagement of the clutch face and confronting face 42 as discussed hereinbefore.

When the time value for sequence timer output 1 (mandrel extend) has elapsed, the timer automatically switches to sequence timer output 2 (cutters in) which activates a corresponding air valve and causes the arbor with circular knives to be actuated into contact with the tube on the fully extended rotating mandrel. Again, because the mandrel is supported prior to rotation to control whipping and because the tube to be cut is displaced minimally, the processing knives need not be actuated a great distance. When the timer switches to output 2 (cutters in), output 1 (mandrel extend) remains activated, keeping the pressure of the drive clutch face against the confronting face 42 of the drive pulley. A normally open limit switch 50 wired in series with the sequence timer circuit assures that the cutters will not be actuated unless the spindle is in the fully extended position.

When the time value for sequence timer output 2 (cutters in) has elapsed, the sequence timer switches to output 3 (cutters out) and the outputs 1 and 2 are deactivated. The cutters are actuated a short distance away from the rotating tube and mandrel. When the time value assigned to output 3 (cutters out) is elapsed and the cutters are actuated away from the cut tube, the sequence timer output 4 (mandrel retract) is activated. Output 3 (cutters out) remains activated. Outputs 1 and 2 (mandrel extend and cutters in) remain de-activated and the mandrel retracts, stripping the cut tube from the mandrel. The cutting sequence on the processed tube is completed and a new tube can be loaded for continuous automatic processing or the cycle can be interrupted for manual restarting according to a single cycle mode.

In an alternative embodiment, the tube positioner according to the invention is implemented in a machine which seams metal ends onto tubular products. Seamed end tube products are used for blueprint storage and mailing containers, among other things.

Figure 9:
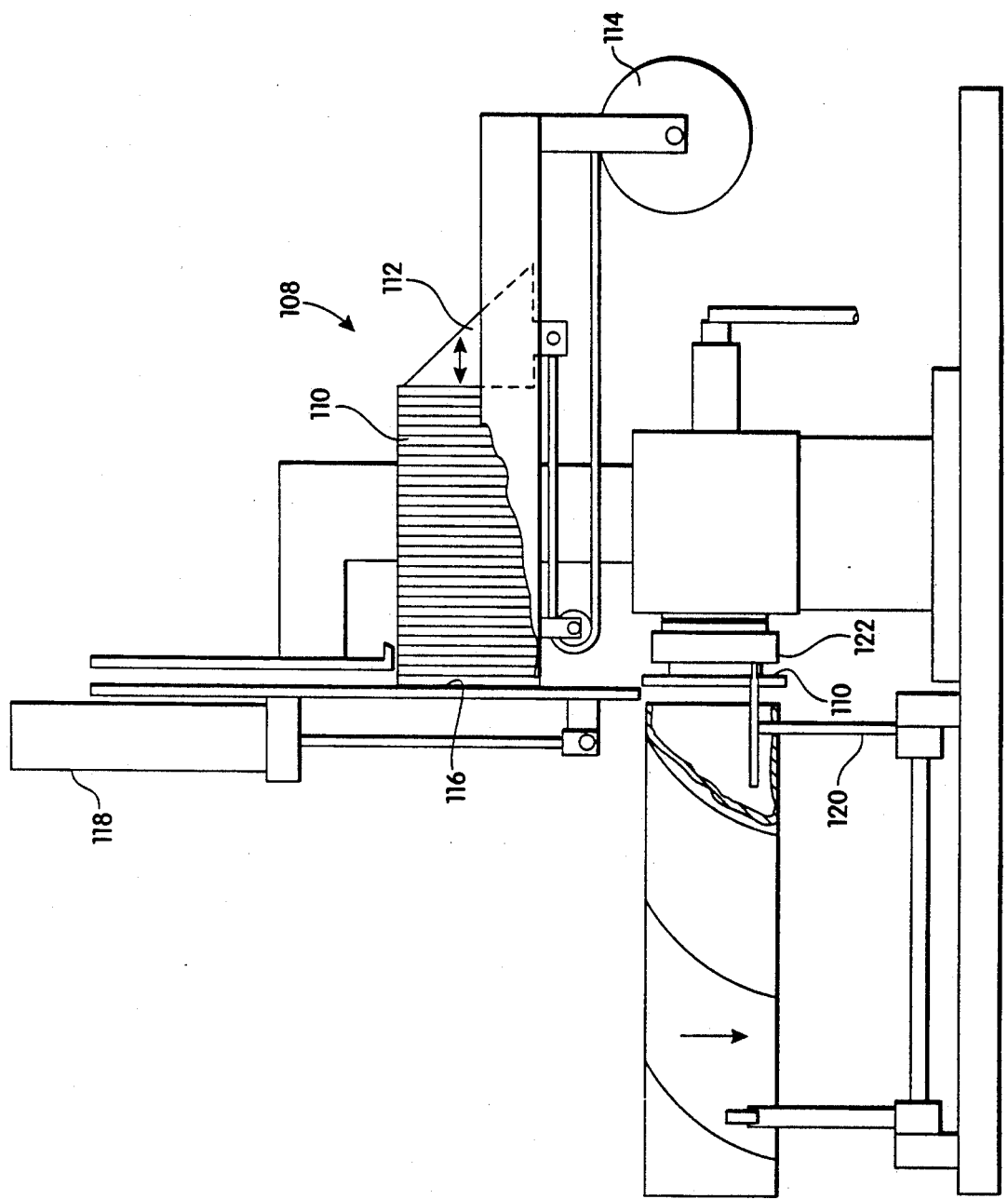
FIG. 9 is an alternative implementation of the positioning apparatus according to the invention implemented in a tube seaming apparatus.
Figure 9A:
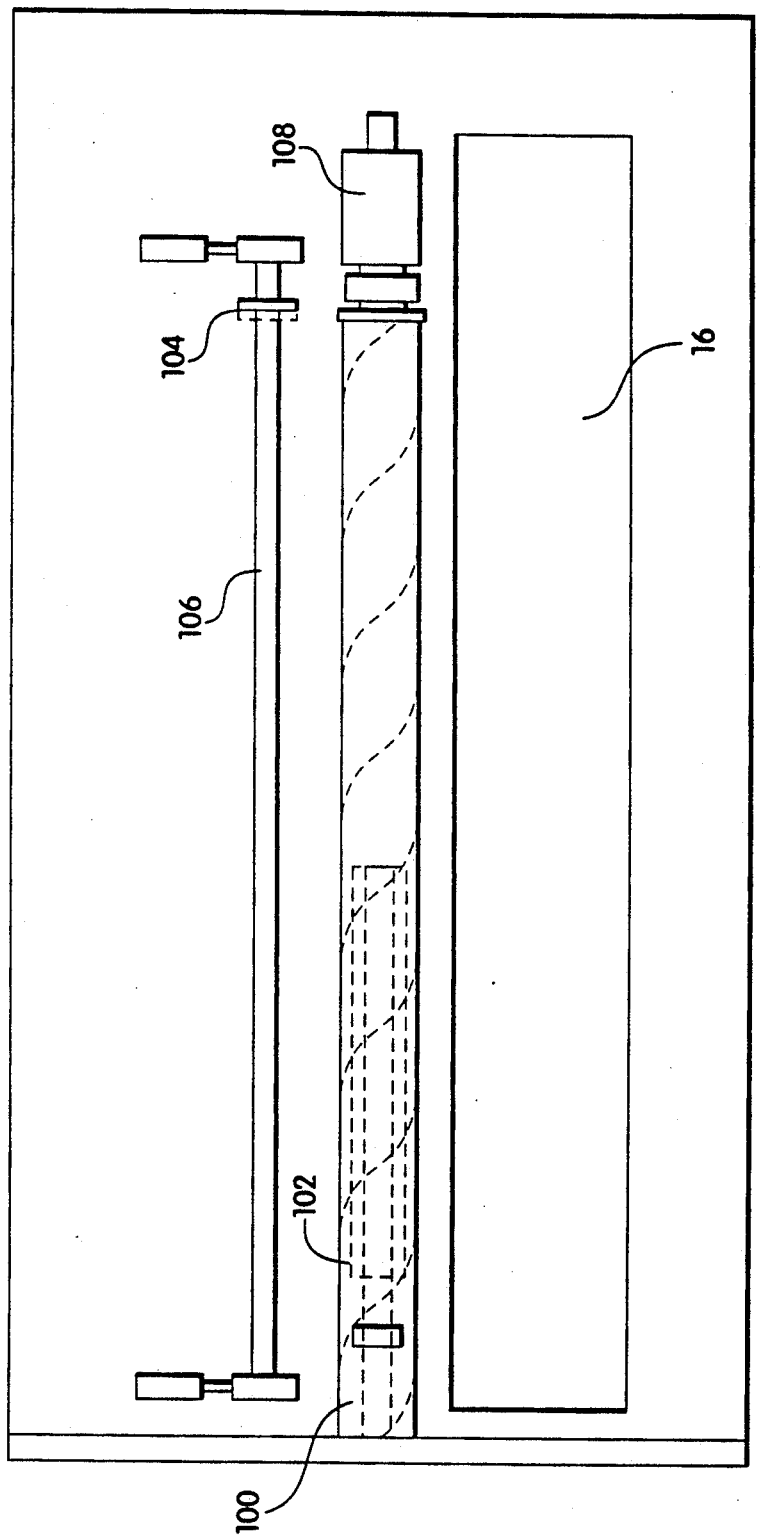
FIG. 9A is a top view of components of the tube seaming apparatus of FIG. 9.

Implementation of the positioning apparatus as discussed hereinbefore in a seaming embodiment is basically the same as for recutting except that the components used for cutting (i.e. frame and arbor with circular knives, etc.) are replaced with seaming components, such as illustrated in FIGS. 9 and 9A. In the seaming application illustrated, the tube positioning portion 20, including the slide block 30, guide rails 32, clutch face, and mandrel drive pulley 36 function substantially a described hereinbefore with respect to the recutter application.

For the seaming application, the mandrel holder 26 is equipped with a short mandrel 100 (shown in phantom in FIG. 9A) having a shoulder 102 for engaging and urging a tube against a metal end to be seamed onto the tube. The arbor and knives assembly of the recutter implementation is replaced with a standard seaming die 104, as known in the art, disposed on a shaft 106 attached to the actuatable frame 64. The mandrel end support bearing 5 is replaced with an end-cap feed mechanism 108, illustrated in FIG. 9, which feeds metal end caps 110 to be seamed onto the tube. The metal end caps 110 are stacked on a feeder 112 and held upright and taught by a spring loaded retractable pulley 114. The end caps 110 are fed downwardly toward a positioned tube, by a feeder surface 116 actuated by a feeder cylinder 118. A modified locating device 120 aligns the tube end and the end cap to be seamed which is held in place by a magnetic or vacuum seaming chuck 122.

Upon issuance of an appropriate output from the programmable timer, the feeder cylinder 118 feeds the end cap into position adjacent the tube, which is positioned in the initial operation(s) of the timer. A subsequent output from the timer causes the seaming die 104 to be actuated into contact with the tube end and cap to effect the seaming operation. Upon completion of seaming, a timing sequence causes the modified locating device 120 to be retracted so that the tube with the seamed end can drop through the cut-out 16 for packaging or conveying.

While applications of the tube positioning mechanism for recutting and seaming are described herein, it will be appreciated that various other applications are conceivable for the positioning mechanism according to the invention.

Although the illustrative embodiments described hereinbefore include a base having two cut-outs, it will be appreciated that any number of cut-outs can be implemented depending upon the application of the apparatus and the location of the various drive means. For instance, the mandrel drive motor could be mounted above the base, as opposed to beneath it, in which case fewer cutouts would be required.

While the implementations described hereinbefore incorporate a mandrel holder which holds a mandrel for positioning a tube according to the invention, it should be appreciated that other means other than a "mandrel", such as a chuck, can be used to hold a tube for positioning.

While the tube recutter implementing the invention is described as including tapered roller bearings for spindle holder rotatability and ball or roller bearings to facilitate the linear motion of the slide block on the guide rails, it will be appreciated that other friction reducing mean and motion facilitators can be implemented. For instance, recirculating oil bearings or air bearings can be used to facilitate friction reduced actuation of the slide block and components.

The actuation and control of positioner components discussed herein is a pneumatic implementation involving various cylinders and pistons to effect actuation, such as the single drive cylinder implemented for actuating the slide block. However, it will be appreciated that actuation and control can be otherwise implemented such as by electronic control systems or hydraulics. Further, while specific numbers of cylinders are disclosed herein in the pneumatic implementation, it is conceivable that lesser or greater numbers of components can be used depending upon system size and application. For instance, two cylinders can be used for driving the slide block to provide balanced drive forces in a smaller or larger recutter application.

Further, the drive cylinder(s) 34, one or more, can be alternatively located. Depending upon the application it may be desirable to locate the slide block drive cylinders on the mandrel actuating side 20 or on the underside of the base providing linkage with the slide block, so long as the travel of the slide block and mandrel is unimpeded.

Although two pairs of shock absorbers are disclosed for cushioning the impact of the actuated slide block and a flat clutch plate is used to engage a flat face of the drive pulley to effect rotation of the mandrel, one of ordinary skill in the art will appreciate that greater or fewer shock absorbers in alternative locations or other impact cushioning means such as bumpers can be implemented, and alternative clutch configurations such as a conical clutch member can be used depending upon the drive forces required and the size and application of the positioner implementation.

While the implementation of the tube positioner described includes a frame and arbor carrying driven circular knives, it should be appreciated that in some applications the knives need not be driven. In still other applications of the tube positioning mechanism according to the invention, such as the seaming implementation, there will be no knives or other cutting means and the "tube cutting portion" as described will not be present but other apparatus will be substituted therefor, performing other operations on the tube, such as seaming or labelling etc.

Although opposed sets of locating devices are described herein as single row ball bearing assemblies alternately spaced and disposed on the end of the feed ramp and on shafts attached to the pivot bar of the tool frame, other locating mechanisms, such as the modified locating device illustrated in the seaming implementation, will provide the desired function of holding a fed tube to be received on an actuating mandrel without impeding mandrel actuation or processed tube discharge.

The central control function described herein is provided by a twenty step programmable sequence timer having eight outputs. However it will be appreciated that greater flexibility and functionality will be achieved by more sophisticated control devices such as any one of various commercially available microcontrollers, or even by merely cascading two or more of the described sequence timers to provide forty or more timed steps and sixteen or more outputs.

Although the invention is shown and described with respect to an illustrative embodiment thereof, various other changes, omissions and additions in the form and detail thereof may be made therein without departing from the spirit and scope of the invention.

What is claimed is:

1. An apparatus for positioning a tubular member for processing, comprising:
   a linear guide;
   a slide member actuatably disposed with respect to said linear guide, said slide member being controllably actuatable in a first direction and a second direction;

a holding mechanism rotatably attached to said slide member, said holding mechanism holding at least one end of said tubular member and being controllably rotatable upon said slide member being substantially fully actuated in one of said first direction and said second direction;

a rotation mechanism imparting controllable rotation to said holding mechanism upon said slide member being substantially fully actuated in one of said first direction and said second direction; and at least one locating device locating said tubular member coaxially with, and substantially in a path coincident to, said holding mechanism, wherein said holding mechanism receives said tubular member from said at least one locating device during actuation of said slide member in one of said first direction and said second direction.

2. The apparatus of claim 1 wherein said linear guide comprises at least one steel rail and said slide member comprises a block slidably and actuatably disposed via bearings attached to said linear guide, said bearings being selected from a group consisting of ball, roller, recirculating oil, and air bearings.

3. The apparatus of claim 1 wherein said holding mechanism includes a clutch face and said rotation mechanism comprises a driven hollow pulley having a confronting face which engages said clutch face upon said slide member being substantially fully actuated in one of said first direction and said second direction, imparting rotation to said holding mechanism.

4. The apparatus of claim 1 further comprising an end support, supporting an end of said holding mechanism when said slide member is substantially fully actuated in one of said first direction and said second direction.

5. The apparatus of claim 4 wherein said end support comprises a guide which urges said holding mechanism into engagement with bearings for reducing friction of said holding mechanism as it is supported in said end support.

6. The apparatus of claim 4 wherein said end support includes a member which abuts said tubular member to substantially preclude lateral movement of said tubular member when said tubular member is engaged on said holding mechanism and said slide member is substantially fully actuated in one of said first direction and said second direction.

7. The apparatus of claim 4 wherein said end support is actuatable coaxially with respect to an axis defining said first direction and said second direction.

8. The apparatus of claim 1 further comprising a feed ramp feeding at least one said tubular member onto said at least one locating device.

9. The apparatus of claim 1 further comprising a stripping mechanism which permits said holding mechanism to pass therethrough upon actuation of said slide member in one of said first direction and said second direction and which engages said tubular member to strip said tubular member from said holding mechanism when said slide member is actuated in another of said first direction and said second direction.

10. The apparatus of claim 9 wherein said stripping mechanism is actuatable coaxially with respect to an axis defining said first direction and said second direction.

11. The apparatus of claim 1 further comprising a plurality of shock dampers disposed to effect dampening of shocks caused by said slide member being actuated in one of said first direction and said second direction.

12. The apparatus of claim 1 further comprising at least one limit switch providing a signal indicative of a position of said slide member.

13. The apparatus of claim 1 further comprising a programmable sequence timer which controls the timing and sequence of positioning of said slide member.

14. The apparatus of claim 1 further comprising a base having at least one cut-out, said at least one cut-out providing a passage for tubular members to pass through subsequent to being stripped from said holding mechanism.

15. The apparatus of claim 14 wherein said base comprises a second cut-out for passage of a drive means, from a drive motor disposed beneath said base to said rotation mechanism, for driving said rotation mechanism.

16. An apparatus for processing tubes, comprising:
a feed ramp receiving tubes for processing on said apparatus;
a base disposed proximate to said feed ramp;
a positioning portion disposed on said base, receiving tubes from said feed ramp, said positioning portion comprising,
a linear guide attached to said base,
a slide member actuatably disposed with respect to said linear guide, said slide member being controllably actuatable in a first direction and a second direction,
a holding mechanism rotatably attached to said slide member, said holding mechanism holding at least one end of at least one of said tubes and being controllably rotatable upon said slide member being substantially fully actuated in one of said first direction and said second direction,
a rotation mechanism imparting controllable rotation to said holding mechanism upon said slide member being substantially fully actuated in one of said first direction and said second direction,
at least one locating device receiving at least one of said tubes and locating said at least one of said tubes coaxially with, and substantially in a path coincident to, said holding mechanism, said holding mechanism receiving said at least one of said tubes from said at least one locating device during actuation of said slide member in one of said first direction and said second direction; and
a processing portion accessing said at least one of said tubes for processing when said slide member is substantially fully actuated in one of said first direction and said second direction.

17. The apparatus of claim 16 further comprising an end support, supporting an end of said holding mechanism when said slide member is substantially fully actuated in one of said first direction and said second direction.

18. The apparatus of claim 17 wherein said processing portion comprises a tube recutting apparatus including
a plurality of cutting devices attached to an arbor and selectably spaced in accordance with a desired cut tube dimension,
an actuatable frame supporting said plurality of cutting devices and said arbor, said actuatable frame being actuatable toward and away from said at least one of said tubes being held on said holding mechanism, a plurality of cut tube ramps disposed proximate to a cut-out in said base of said apparatus disposed substantially beneath said holding mechanism when said holding mechanism is in a fully extended position, at least one of said plurality of cut tube ramps directing cut tube of said desired cut tube dimension to a first receptacle and at least one of said plurality of cut tube ramps directing waste cut tube to a second receptacle.

19. The apparatus of claim 18 wherein said actuatable frame further comprises a drive motor for driving said plurality of cutting devices.

20. The apparatus of claim 18 further comprising a programmable sequence timer controlling a sequence and timing of operation of said slide member and said actuatable frame wherein said sequence timer controls timing of operations in a sequence wherein said slide member actuates, said actuatable frame actuates, said actuatable frame de-actuates, and said slide member de-actuates.

21. The apparatus of claim 16 wherein said processing portion comprises a tube seaming apparatus for seaming an end cap on a tube, including:
an actuatable frame supporting a shaft having a seaming die disposed thereon, said actuatable frame being actuatable toward and away from said tube as said tube is held on said holding mechanism;
an end cap feed mechanism, said end cap feed mechanism comprising,
a feed stack having at least said end cap disposed thereon,
a cap chuck receiving said end cap and holding said end cap substantially in alignment with said holding mechanism to facilitate engagement of said at least one of said tubes and said end cap when said slide member is actuated in one of said first and said second direction,
an actuatable feed surface conveying said end cap from said feed stack to said cap chuck,
wherein said tube is held on said holding mechanism when said slide member is actuated in one of said first direction and said second direction whereupon at full extension of said holding mechanism rotation is imparted to said holding mechanism an said tube thereon and said end cap is engaged by said tube whereupon said actuatable frame is actuated such that said seaming die engages at least one of said tube and said end cap to seam said end cap onto said tube.

22. The apparatus of claim 21 further comprising a tube end/end cap locating device aligning an end of said tube and said end ca and a stripping mechanism for stripping said tube from said holding mechanism.

23. The apparatus of claim 22 further comprising a cut-out in said base of said apparatus disposed substantially beneath said holding mechanism when said holding mechanism is in a fully extended position, said tube end/end cap locating device being actuatable such that said tube having said end cap seamed thereon drops unimpeded through said cut-out upon stripping of said tube from said holding mechanism as said holding mechanism is retracted from said fully extended position.

* * * * *

UNITED STATES PATENT AND TRADEMARK OFFICE
CERTIFICATE OF CORRECTION

PATENT NO. : 5,214,988

DATED : June 1, 1993

INVENTOR(S) : John C. Quigley

It is certified that error appears in the above-identified patent and that said Letters Patent is hereby corrected as shown below:

Column 2, line 21, "dds to" should read --adds to--.

Column 5, line 15, "located 12 centrally" should read --located centrally--.

Column 6, line 23, "tube o the" should read --tube on the--.

Column 7, line 5, "s that" should read --so that--.

Column 7, line 43, "in progress The" should read --in progress. The--.

Column 9, line 14, "5 is replaced" should read --54 is replaced--.

Column 14, line 13, "an said" should read --and said--.

Signed and Sealed this

Twenty-first Day of June, 1994

Attest:

BRUCE LEHMAN

*Attesting Officer*   *Commissioner of Patents and Trademarks*